United States Patent
Xiao et al.

(10) Patent No.: US 7,354,981 B2
(45) Date of Patent: Apr. 8, 2008

(54) POLYETHYLENE CATALYST AND A PROCESS FOR PREPARING THE SAME

(75) Inventors: Mingwei Xiao, Shanghai (CN); Shijiong Yu, Shanghai (CN); Xiaofeng Ye, Shanghai (CN)

(73) Assignees: China Petroleum & Chemical Corporation, Chaoyang District, Beijing (CN); Shanghai Research Institute of Chemical Industry, Putuo District, Shanghai (CN)

( * ) Notice: Subject to any disclaimer, the term of this patent is extended or adjusted under 35 U.S.C. 154(b) by 0 days.

(21) Appl. No.: 11/003,236

(22) Filed: Dec. 3, 2004

(65) Prior Publication Data

US 2005/0170949 A1 Aug. 4, 2005

(30) Foreign Application Priority Data

Dec. 3, 2003 (CN) .................. 2003 1 0109018

(51) Int. Cl.
*C08F 110/02* (2006.01)

(52) U.S. Cl. .................. 526/352; 526/129; 526/125.1; 526/158; 526/124.3; 526/124.2; 526/124.1; 502/115; 502/227; 502/233; 502/250

(58) Field of Classification Search ................ 502/103, 502/115, 227, 233, 250; 526/352, 129, 125.1, 526/158, 124.3, 124.2, 124.1
See application file for complete search history.

(56) References Cited

U.S. PATENT DOCUMENTS

| | | | | |
|---|---|---|---|---|
| 4,302,565 A | * | 11/1981 | Goeke et al. | 526/88 |
| 4,349,648 A | * | 9/1982 | Jorgensen et al. | 526/124.6 |
| 4,525,558 A | * | 6/1985 | Takitani et al. | 526/142 |
| 4,894,424 A | * | 1/1990 | Lassalle | 526/124.5 |
| 4,946,816 A | * | 8/1990 | Cohen et al. | 502/126 |
| 4,959,427 A | * | 9/1990 | Furuhashi et al. | 526/142 |
| 4,970,184 A | * | 11/1990 | Schauss et al. | 502/107 |
| 5,204,303 A | * | 4/1993 | Korvenoja et al. | 502/9 |
| 5,770,540 A | | 6/1998 | Garoff et al. | |
| 6,121,393 A | * | 9/2000 | Kioka et al. | 526/124.3 |
| 6,303,716 B1 | * | 10/2001 | Xiao et al. | 526/129 |
| 6,306,985 B1 | * | 10/2001 | Xiao et al. | 526/158 |
| 6,828,395 B1 | * | 12/2004 | Ehrman et al. | 526/114 |
| 2004/0248729 A1 | * | 12/2004 | Xiao et al. | 502/104 |

FOREIGN PATENT DOCUMENTS

| | | | |
|---|---|---|---|
| CN | 1041312 C | | 12/1998 |
| CN | 1098866 C | * | 1/2003 |
| CN | 1098866 C | | 1/2003 |
| CN | 1098867 C | | 1/2003 |
| CN | 1098867 C | * | 1/2003 |
| EP | 000120503 A1 | * | 10/1984 |
| EP | 000584626 A2 | * | 3/1994 |
| EP | 000771820 A1 | * | 5/1997 |
| EP | 0 949 274 | | 10/1999 |
| WO | 2004/050723 | | 6/2004 |

OTHER PUBLICATIONS

English Abstract of WO 2004/050723 dated Jun. 17, 2004.

* cited by examiner

*Primary Examiner*—Ling-Sui Choi
(74) *Attorney, Agent, or Firm*—Ladas and Parry LLP

(57) ABSTRACT

The present invention discloses a polyethylene catalyst and a process for preparing the same, said catalyst being composed of a main component of catalyst and a cocatalyst, wherein the main component of catalyst is prepared by reacting: (1) a magnesium-alcohol complex, (2) an alkyl aluminum compound having a formula $R^3_n AlCl_{3-n}$ supported on silica, and (3) a titanium compound having a formula $Ti(OR^2)_m Cl_{4-m}$, and the cocatalyst is an organic aluminum compound. The catalyst of the present invention has advantages including high polymerization activity, less difference between the polymerization activities at low hydrogen level condition and at high hydrogen level condition, stable polymerization reaction, good particle morphology of catalyst, and less fine powder of polymer product.

25 Claims, No Drawings

POLYETHYLENE CATALYST AND A PROCESS FOR PREPARING THE SAME

CROSS REFERENCE OF RELATED APPLICATION

The present application claims priority CN 200310109018.7, filed on Dec. 3, 2003, which is incorporated herein by reference in its entirety and for all purposes.

TECHNICAL FIELD

The present invention relates to a polyethylene catalyst and a process for preparing the same.

BACKGROUND ART

At present, researches on Ziegler-Natta catalysts involve the control of catalytic activity, studies on the behavior of polymerization, the effects of catalyst properties on the polymer properties, and so on. Among these researches, the enhancement of polymerization efficiency of catalysts is still one of important aspects for improving the performances of catalysts. Generally, although a chain transfer agent can be used for adjusting molecular weight of polymer in a polymerization process, it may affect the activity of catalyst in some extent simultaneously. A usually used chain transfer agent is hydrogen gas, and molecular weight of polymer is generally adjusted by adjusting a level of hydrogen in a polymerization process. However, with the increase of hydrogen content, polymerization activity of a catalyst typically decreases remarkably.

For example, the Chinese Patent ZL98110608 discloses a supported catalyst for gas-phase polymerization of ethylene. When the polymerization is carried out at a polymerization pressure of 1.0 MPa and an ethylene fractional pressure of 0.5-0.6 MPa for 4 hours, said catalyst exhibits a polymerization activity of from 2000 to 5000 grams polyethylene per gram catalyst. However, as shown in gas-phase polymerization evaluation carried out in Example 10 of said patent, when hydrogen level increases from $H_2/C_2H_4=0.125$ to $H_2/C_2H_4=2.0$, the polymerization activity of the same catalyst deceases from 5020 g polyethylene/g catalyst to 2500 g polyethylene/g catalyst, i.e., drops by about 50%, while the melt index of polyethylene ($MI_{2.16}$) increases 3.9 g/10 min to 102 g/10 min.

The Chinese Patent ZL98110609 discloses a catalyst for slurry polymerization of ethylene. In slurry polymerization evaluation carried out in Example 10 of said patent, when hydrogen level in the polymerization system increases from $H_2/C_2H_4=0.33$ to $H_2/C_2H_4=3.0$, polymerization activity of a catalyst decreases from 459,000 g polyethylene/g Ti to 58,000 g polyethylene/g Ti, i.e., drops by about 85%, while melt index of polyethylene ($MI_{2.16}$) increases from 3.4 g/10 min to 322 g/10 min. Thus, there is a need to develop a catalyst exhibiting good balance between activity when preparing high molecular weight (low melt index) polymer and that when preparing low molecular weight (high melt index) polymer.

U.S. Pat. No. 5,770,540 and EP 0949274 separately disclose a catalyst for polymerization of ethylene, which exhibits a good activity balance when preparing high molecular weight (low melt index) polymer and when preparing low molecular weight (high melt index) polymer. Said catalyst is prepared by reacting an inorganic support, a chloride supported on said support, a magnesium compound and a titanium halide, wherein the magnesium compound is obtained by reacting a dialkyl magnesium with same or different alkyl groups and a monohydric alcohol with a branched chain. Said catalyst exhibits a high polymerization activity, and the polymerization activity is not sensitive to change of hydrogen level in the polymerization system. In the polymerization examples of U.S. Pat. No. 5,770,540, when the hydrogen level increases from $H_2/C_2H_4=0.25$ to $H_2/C_2H_4=2.0$, polymerization activity of a catalyst decreases from 6000 g polyethylene/g catalyst to 4200 g polyethylene/g catalyst, i.e., drops by merely 30%, while melt index of polyethylene ($MI_{2.16}$) increases from 2.0 g/10 min to 140 g/10 min. However, said catalyst must be prepared by using a dialkyl magnesium as starting material, and thus has a relatively high cost.

SUMMARY OF THE INVENTION

In order to solve the problems suffered by the prior art, the present invention provides a novel catalyst, which exhibits a good balance in polymerization activity when preparing a low molecular weight polymer and when preparing a high molecular weight polymer and has good hydrogen response and copolymerization performance, in a cost-effective way.

The present invention further provides a process for preparing the same catalyst.

The present invention further provides a process for polymerizing ethylene and optional α-olefin comonomer(s) having from 3 to 20 carbon atoms.

DETAILED DESCRIPTION OF THE INVENTION

The polyethylene catalyst of the present invention comprises component A and component B, wherein the component A is a main component of the catalyst, and the component B is a cocatalyst. The component A is obtained by reacting the following components:

(1) a magnesium-alcohol complex prepared by reacting a magnesium compound in nascent state having a formula $(MgRX)_y(MgX_2)$ with an alcohol compound $R^1OH$ and an electron donor ED, wherein R is alkyl having 3-12 carbon atoms, X is halogen, y is in a range of from 0.02 to 4, and $R^1$ is alkyl having 2-12 carbon atoms, and wherein molar ratio of the alcohol compound to Mg in the magnesium compound in nascent state, $R^1OH:Mg$, is in a range of from 0.5:1 to 6:1;

(2) an alkyl aluminum compound having a formula $R^3{}_nAlCl_{3-n}$ supported on silica, wherein $R^3$ is alkyl having 1-14 carbon atoms, and n is In a range of from 1 to 3; and (3) a titanium compound having a formula $Ti(OR^2)_mCl_{4-m}$, wherein $R^2$ is alkyl having 1-10 carbon atoms, and m is in a range of from 0 to 4.

The component B is an organic aluminum compound, and molar ratio of Al in the component B to Ti in the component A is in a range of from 30:1 to 300:1.

The above component A, i.e. the main component of the catalyst, is another subject matter of the present invention.

In the preparation of the component A of the catalyst according to the present invention, the used magnesium compound in nascent state is obtainable by reacting a commercially available magnesium power with a halogenated alkane, and has a rational formula $(MgRX)_y(MgX_2)$, wherein R is alkyl having 3-12 carbon atoms; y=0.02 to 4.0, preferably y=0.1 to 1.85; X is halogen, preferably Cl. The process for preparing the magnesium compound is detailedly described in CN1041312C and WO2004/050723, which are incorporated herein by reference in their entirety.

In the preparation of the component A of the catalyst according to the present invention, the used alcohol compound has a formula $R^1OH$, wherein $R^1$ is alkyl having from 2 to 12 carbon atoms, preferably from 4 to 8 carbon atoms. Examples of the alcohol compound include, but are not limited to, isobutanol, 2-ethylhexanol, 2-methylpentanol, 2-ethylbutanol, octanol or a mixture thereof. Molar ratio of said alcohol compound $R^1OH$ to Mg in the magnesium compound in nascent state is in a range of from 0.5:1 to 6:1, preferably from 1:1 to 3:1.

In the preparation of the component A of the catalyst according to the present invention, the used electron donor ED is an organic compound containing at least one selected from the group consisting of O, S, N, Si and P atom, and should be in liquid state at room temperature. The magnesium compound in nascent state and the alcohol, compound are soluble in the electron donor. Examples of the electron donor include diethyl ether, tetrahydrofuran, ethyl acetate, ethyl benzoate, tributyl phosphate, isobutanol, N,N-dimethylformamide, etc. The electron donor can be used alone or in combination. The preferable electron donor in the present invention is tetrahydrofuran.

In the preparation of the component A of the catalyst according to the present invention, the used alkyl aluminum compound of formula $R^3{}_nAlCl_{3-n}$ can be, for example, triethyl aluminum, triisopropyl aluminum, triisobutyl aluminum, tri(n-octyl)aluminum, tri(2-ethylhexyl)aluminum, diethyl aluminum chloride, ethyl aluminum dichloride, diisopropyl aluminum chloride, ethyl aluminum sesquichloride, butyl aluminum sesquichloride; preferably alkylaluminum chlorides.

In the preparation of the component A of the catalyst according to the present invention, the used silica has an average particle size ranging from 5 to 250 microns, preferably from 10 to 90 microns, and a specific surface area of at least 3 m²/g preferably from 30 to 500 m²/g. The silica can be selected from commercial products, such as Crosfield ES70X. Grace Davison 955, 948, etc.

In the preparation of the component A of the catalyst according to the present invention, a titanium compound having a formula $Ti(OR^2)_mCl_{4-m}$, wherein $R^2$ is alkyl having from 1 to 10 carbon atoms, preferably from 1 to 4 carbon atoms, and m is in a range of from 0 to 4, is used. Examples of suitable titanium compound include, but are not limited to, titanium tetrachloride, tetra-n-butyl titanate, methoxy titanium trichloride, butoxy titanium trichloride, and mixtures thereof, with titanium tetrachloride being preferable.

As the component B of the catalyst according to the present invention, the organic aluminum compound can be, for example, triethyl aluminum, diethyl aluminum chloride, triisobutyl aluminum, tri(n-hexyl)aluminum, and preferably triethyl aluminum.

The polyethylene catalyst of the present invention can be prepared by a process comprising the steps of (1) preparing magnesium-alcohol complex: dissolving the magnesium compound in nascent state of the formula $(MgRX)_y(MgX_2)$ in the electron donor ED to form a homogenous solution, reacting said solution with the alcohol compound $R^1OH$ to obtain a solution of magnesium-alcohol complex in the electron donor ED, wherein R is alkyl having 3-12 carbon atoms, X is halogen, y is in a range of from 0.02 to 4, and $R^1$ is alkyl having 2-12 carbon atoms, and wherein molar ratio of the alcohol compound to Mg in the magnesium compound in nascent state, $R^1OH/Mg$, is in a range of from 0.5:1 to 6:1;

(2) supporting the alkyl aluminum compound of the formula $R^3{}_nAlCl_{3-n}$ on the silica, wherein $R^3$ is alkyl having 1-14 carbon atoms, and n is in a range of from 1 to 3, and wherein the alkyl aluminum compound is used in such an amount that the molar ratio of Al in $R_3{}_nAlCl_{3-n}$ to $R^1OH$ is in a range of from 0.1:1 to 1.5:1;

(3) reacting the solution of magnesium-alcohol complex in electron donor with the silica having the alkyl aluminum compound supported thereon by impregnating, and then drying the resultant mixture to obtain a solid product, wherein the content of the residual electron donor ED in the solid product is controlled in a range of from 1 to 10 percent by weight, and wherein the amount of said silica ranges from 0.2 to 1.0 g relative to per millimole of Mg;

(4) reacting the solid product of the step (3) with the titanium compound of formula $Ti(OR^2)_mCl_{4-m}$, in which $R^2$ is alkyl having 1-10 carbon atoms, and m is in a range of from 0 to 4, in a hydrocarbon solvent, and then drying the reaction mixture to obtain a solid main component of catalyst, wherein the titanium compound is used in such an amount that molar ratio of Mg in the product of the step (3) to Ti in the titanium compound is equal to (0.5-5):1;

(5) contacting the main component of catalyst with a cocatalyst to form a catalyst, wherein the cocatalyst is an organic aluminum compound, and molar ratio of Al in the cocatalyst to Ti in the main component of the catalyst ranges from 30:1 to 300:1.

In the present invention, one of the key points is the formation of the magnesium-alcohol complex. As stated above, the magnesium-alcohol complex is obtained by reacting the magnesium compound in nascent state of the formula $(MgRX)_y(MgX_2)$ with the alcohol compound $R^1OH$ in the presence of the electron donor ED, wherein X is halogen, preferably Cl, and the molar ratio of the alcohol compound to Mg in the magnesium compound in nascent state, $R^1OH/Mg$, is in a range of from 0.5:1 to 6:1, preferably from 1:1 to 3:1.

Without limited to any specific theory, it is believed that the alcohol compound $R^1OH$ reacts at first with the MgRCl group in the magnesium compound in nascent state of the formula $(MgRCl)_y(MgCl_2)$ according to the following reaction equation:

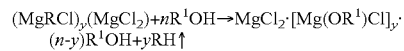

The alcohol compound $R^1OH$ can be added to the solution of the magnesium compound in nascent state at ambient temperature, either in a batch or dropwise. If it is added dropwise, the period of time for adding said alcohol compound may be about 10 minutes and even up to about 2 hours. After the addition of the alcohol compound, the temperature can be elevated to 20-70° C., preferably 25-55° C., and the reaction is continued for 2-10 hours, preferably 4-8 hours.

In the present invention, the silica is used as a carrier, and said carrier can be heat treated at high temperature in a manner known in the art for reducing the content of hydroxy groups on its surface prior to use. For example, the silica can be heat treated at a temperature of from 200 to 1000° C., preferably from 300 to 800° C. Preferably, the silica is treated under nitrogen gas flow in a fluidized bed at 600-700° C. for 10 hours, and then is discharged for standby.

The heat-treated silica forms a slurry in a hydrocarbon solvent, and then contacts and reacts with the alkyl aluminum compound of formula $R^3_n AlCl_{3-n}$, wherein the amount of the alkyl aluminum compound of formula $R^3_n AlCl_{3-n}$ depends on the amount of the alcohol compound of formula $R^1OH$, that is, the alkyl aluminum compound of formula $R^3_n AlCl_{3-n}$ is used in such an amount that molar ratio of Al in $R^3_n AlCl_{3-n}$ to $R^1OH$ is in a range of from 0.1:1 to 1.5:1, preferably from 0.3:1 to 1.0:1. This support process is usually carried out at room temperature for 0.5-4 hours, preferably 1-2 hours. Finally, solid particles, silica having the alkyl aluminum compound of formula $R^3_n AlCl_{3-n}$ supported thereon, with excellent flowability are obtained by drying at a temperature of from 60 to 80° C., optionally under nitrogen gas flow.

The silica having the alkyl aluminum compound of formula $R^3_n AlCl_{3-n}$ supported thereon reacts with the solution of magnesium-alcohol complex formed in the step (1) by impregnating. The amount of the silica can vary depending on the amount of Mg in the reaction system, so that there may exist about 0.2 to about 1.0 grams of silica relative to one millimole of Mg, preferably from about 0.3 to about 0.9 grams of silica relative to one millimole of Mg. The functions of the alkyl aluminum compound of formula $R^3_n AlCl_{3-n}$ are to extricate alcohol and optionally to chlorinate. Firstly, a reaction of extricating alcohol occurs between the alkyl aluminum compound of formula $R^3_n AlCl_{3-n}$ and the alcohol compound in the magnesium-alcohol complex according to the following equation:

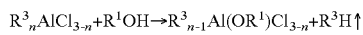

$$R^3_n AlCl_{3-n} + R^1OH \rightarrow R^3_{n-1} Al(OR^1)Cl_{3-n} + R^3H\uparrow$$

In the meantime, in the case where said alkyl aluminum compound contains chlorine, i.e., in the case where n in the formula $R^3_n AlCl_{3-n}$ is not 3, said alkyl aluminum compound will further chlorinate the $Mg(OR^1)Cl$ group in the magnesium-alcohol complex to form active $MgCl_2$ that will be supported on the silica. The reactive impregnation can be carried out at a temperature of from 0 to 100° C., preferably from 20 to 80° C., more preferably from 40 to 60° C., for 0.5-12 hours, preferably for 1-10 hours, more preferably for 2-8 hours. Then the reaction mixture can be dried at a temperature of from 70 to 90° C., optionally under nitrogen gas flow, to an extent that the content of the residual electron donor in resultant solid product is in a range of from 1 to 10 wt. %, preferably from 3 to 6 wt. %, based on the total weight of the solid product, to obtain solid particles mainly comprising Mg, Al, halogen, alkoxy and electron donor.

The solid particles obtained in the step (3) are dispersed in a hydrocarbon solvent to form a slurry, and the titanium compound of formula $Ti(OR^2)_m Cl_{4-m}$ can be added thereto at room temperature. The amount of the titanium compound can vary depending on the amount of Mg in the reaction system so that molar ratio of Mg to Ti can be equal to (0.5-5):1, preferably (1-4):1. The titanium compound can be added either in a batch or dropwise. If it is added dropwise, the period of time for addition may be about 10 minutes and even up to about 2 hours. After the addition of the titanium compound, the reaction is continued at a temperature of from 20 to 80° C., preferably from 40 to 70° C., for 1-10 hours, preferably for 3-8 hours. Upon the completion of the reaction, the reaction mixture is dried at, for example, 60 to 80° C. to obtain the solid component A of the catalyst.

The hydrocarbon solvent used in the above steps include aliphatic hydrocarbons, alicyclic hydrocarbons, and aromatic hydrocarbons, preferably aliphatic hydrocarbons having 5-10 carbon atoms, such as n-pentane, isopentane, n-hexane, n-octane, heptane, and mixture thereof.

The component A obtained according to the above preparation process can be completely activated in situ by adding the component A and an activator at a certain ratio separately in polymerization reactor, or can be preactivated with an activator prior to introducing the component A in polymerization reactor. The used activator is an alkyl aluminum compound, such as diethyl aluminum chloride, triethyl aluminum, tri(n-hexyl)aluminum, ethyl aluminum dichloride, and mixtures thereof. The amount of the activator is determined according to the amount of the residual electron donor in the component A, and generally is 60-70% by mole of the residual electron donor.

The polyethylene catalyst of the present invention is obtained by contacting the component A and the component B, wherein molar ratio of Ti in the component A to Al in the component B is in a range of from 1:30 to 1:300, preferably from 1:50 to 1:250.

The polyethylene catalyst of the present invention can be used in the slurry and gas-phase polymerization processes known per se for the production of polyethylene. Polymerization conditions for these processes are well known to those skilled in the art. For instance, in the case of slurry polymerization process, the polymerization temperature can be in a range of from 40 to 150° C., preferably from 55 to 130° C., and more preferably from 60 to 100° C.; and in the case of gas-phase polymerization process, the polymerization temperature can be in a range of from 50 to 130° C., preferably from 65 to 115° C., and more preferably from 70 to 110° C. The total pressure for the polymerization can be normal pressure up to 10 MPa, preferably from 0.3 to 6 MPa. As examples of the solvent used in the slurry polymerization process, n-butane, isobutene, n-pentane, isopentane, and n-hexane can be mentioned.

The catalyst of the present invention can be used in the homopolymerization of ethylene, and in the copolymerization of ethylene and aliphatic olefin having 3-20, preferably 3-8 carbon atoms. Examples of the suitable α-olefin include propylene, 1-butene, 1-pentene, 1-hexene, 4-methyl-1-pentene, 1-heptene, and 1-octene. The preferable α-olefin is 1-butene and 1-hexene.

In the polymerization of ethylene using the catalyst of the present invention, hydrogen gas can be used as chain transfer agent to adjust the melt index of polymer, and a polyethylene product with a melt index (MI2.16) of from 0 to 1000 or more grams per 10 minutes can be obtained.

The process for polymerizing ethylene, comprising contacting ethylene and optional α-olefin comonomer(s) having from 3 to 20 carbon atoms with the catalyst of the invention under polymerization conditions, constitutes another aspect of the invention.

In one embodiment of this aspect, the invention is to provide a process for polymerizing ethylene, comprising the steps of:

(i) providing a catalyst according to the invention;
(ii) contacting ethylene and optional α-olefin comonomer(s) having from 3 to 20 carbon atoms with the catalyst under polymerization conditions, to form a polyethylene product; and
(iii) recovering the polyethylene product.

In a preferable embodiment of this aspect, the invention is to provide a process for polymerizing ethylene, comprising the steps of:

(i) providing a catalyst according to the invention;
(ii) contacting ethylene with the catalyst under polymerization conditions including a high molar ratio of hydrogen gas to ethylene, to form a polyethylene having low molecular weight containing active catalyst therein;

(iii) contacting ethylene and α-olefin comonomer(s) having from 3 to 20 carbon atoms with said polyethylene having low molecular weight containing active catalyst therein under polymerization conditions including a low molar ratio of hydrogen gas to ethylene, to form a polyethylene polymer having bimodal or broad distribution of molecular weight; and (iv) recovering the polyethylene polymer.

Compared with the prior art, the polyethylene catalyst of the present invention has the following advantages:

1) The catalyst of the present invention exhibits a high polymerization activity. When the polymerization is carried out at a total pressure of 1.0 MPa with $H_2/C_2H_4=0.25$ for 2 hours, the polymerization activity is up to 4000-6000 g PE/g Cat.

2) The catalyst of the present invention exhibits a good balance of activities when preparing a low molecular weight polymer and when preparing a high molecular weight polymer, and has good hydrogen response.

3) The catalyst of the present invention possesses good copolymerization performance, and can be used for the production of polyethylene having a density of 0.910-0.960 g/cm$^3$.

4) The catalyst of the present invention has good particle morphology, and the polymer product contains less fine powder.

EXAMPLES

The following examples are used to Illustrate the present invention and by no means intended to limit the scope thereof.

In the examples, the test of properties and indices of polymer product are performed using the following methods:

Melt index (MI) is measured according to ASTM-D1238, condition E, at 190° C.;

Density of polymer is measured according to ASTM-1050;

Bulk density of polymer is measured according to ASTM-D1895;

Particle size distribution of polymer is measured by sieving using standard sieves.

Examples 1-10

Catalysts were prepared according to the following process with amounts of some starting materials being changed, and were evaluated by polymerization. The amounts of the starting materials and the contents of main components of the catalysts obtained thereby are summarized in Table 1.

Preparation of the Main Component A of Catalyst:

(1) In a reactor flask, a commercially available powdered magnesium reacted with n-butyl chloride according to the method disclosed in CN1041312C and WO 2004050723, to obtain a solution of magnesium compound in nascent state of formula $(MgBuCl)_y(MgCl_2)$ In tetrahydrofuran (THF) as electron donor. Different y values were obtained by changing the ratio of powdered magnesium to n-butyl chloride. Then, 2-ethyl-hexanol ($C_8H_{17}OH$) was added in one batch to the solution at room temperature, and then the reaction was heated to 50° C., and allowed to continue for 2 hours, to give a solution of magnesium-alcohol complex in THF.

(2) Under nitrogen gas flow, a silica (Grace Davison 955) was gradually heated to 600° C. and kept at the temperature for 10 hours, then it was gradually cooled to room temperature for standby. To about 7 g of the heat-treated silica were added 40 ml of hexane and an amount of diethyl aluminum chloride (DEAC), and then the mixture was dried to give a silica carrier having alkyl aluminum compound supported thereon.

(3) The treated silica carrier (the product of step (2)) was added into the solution of the magnesium-alcohol complex in THF prepared in the step (1), and the reaction was allowed to continue at 50° C. for 3 hours, and then was heated to 75° C. for drying. Drying was performed until the content of residual THF in the solid component fell within a predetermined range.

(4) The product of the step (3) was slurried in 50 ml of hexane, then titanium tetrachloride was added thereto at room temperature. The reaction was allowed to continue at 50° C. for 3 hours, and then was heated to 70° C. to evaporate hexane, to give the solid main component A of catalyst.

Polymerization Test for Evaluation:

Slurry polymerization evaluation was carried out in a 2 L reactor. Hexane solvent (1000 ml), the solid main component A of catalyst, and triethyl aluminum as the component B were separately added Into the reactor, with the ratio of Al/Ti being 200. After the temperature was elevated to 75° C., an amount of hydrogen gas was added into the reactor, and then ethylene was continuously added into the reactor to maintain the total pressure at 1.0 MPa. The temperature was further elevated to 85° C. and the reaction was kept at said temperature for 2 hours. Then feed of ethylene was stopped, the reactor was cooled rapidly and the gases therein were vented. The polymer slurry was recovered, and polyethylene powder was separated from hexane. The polymerization conditions and results of the polymerization evaluation of catalysts are shown in Table 2.

TABLE 1

| Example No. | SiO$_2$ (g) | $(MgBuCl)_y(MgCl_2)$ | | $C_8H_{17}OH$ (mmol/g)* | DEAC (mmol/g)* | THF (wt %) | TiCl$_4$ (mmol/g)* | Analysis of main components of catalyst | | | |
|---|---|---|---|---|---|---|---|---|---|---|---|
| | | y | Amount (mmol/g)* | | | | | Mg(wt %) | Ti (wt %) | Al(wt %) | Cl(wt %) |
| 1 | 7.06 | 0.12 | 2.0 | 2.0 | 1.4 | 1.4 | 0.93 | 2.53 | 2.24 | 1.70 | 16.13 |
| 2 | 7.23 | | 2.0 | 2.0 | 2.0 | 6.0 | 0.78 | 2.45 | 1.90 | 2.25 | 15.27 |
| 3 | 7.11 | 0.28 | 2.0 | 1.4 | 1.4 | 5.4 | 0.74 | 2.58 | 1.86 | 1.98 | 14.47 |
| 4 | 7.00 | | 2.0 | 2.4 | 2.4 | 3.5 | 0.92 | 2.26 | 2.10 | 2.52 | 15.52 |
| 5 | 7.25 | 0.75 | 2.0 | 3.4 | 1.7 | 5.2 | 0.65 | 2.31 | 1.50 | 1.86 | 11.86 |
| 6 | 7.16 | | 2.0 | 4.0 | 4.8 | 7.6 | 1.26 | 1.83 | 2.12 | 4.39 | 15.71 |

TABLE 1-continued

| Example No. | SiO$_2$ (g) | (MgBuCl)$_y$(MgCl$_2$) | | C$_8$H$_{17}$OH (mmol/g)* | DEAC (mmol/g)* | THF (wt %) | TiCl$_4$ (mmol/g)* | Analysis of main components of catalyst | | | |
|---|---|---|---|---|---|---|---|---|---|---|---|
| | | Amount (mmol/g)* | y | | | | | Mg(wt %) | Ti(wt %) | Al(wt %) | Cl(wt %) |
| 7 | 7.20 | 2.0 | 1.44 | 3.2 | 3.2 | 8.5 | 0.70 | 1.97 | 1.42 | 3.15 | 12.57 |
| 8 | 7.08 | 2.0 | | 5.0 | 4.0 | 5.6 | 1.03 | 1.80 | 1.76 | 3.38 | 13.36 |
| 9 | 7.15 | 2.0 | 2.33 | 4.0 | 4.0 | 2.3 | 0.82 | 2.01 | 1.68 | 2.98 | 14.03 |
| 10 | 7.10 | 2.0 | | 6.0 | 2.0 | 8.4 | 0.63 | 1.88 | 1.21 | 2.10 | 9.71 |

*"mmol/g" in Table 1 means the millimoles of various components added relative to per gram of silica.

TABLE 2

| Example No. | Low H$_2$ level (H$_2$/C$_2$H$_4$) | High H$_2$ level (H$_2$/C$_2$H$_4$) | Polymerization activity (gPE/gcat) | Bulk density (g/cm$^3$) | MI$_{2.16}$ (g/10 min) |
|---|---|---|---|---|---|
| 1 | 0.2/0.8 | / | 6189 | 0.373 | 1.73 |
|   | /       | 0.7/0.3 | 2716 | 0.311 | 206.3 |
| 2 | 0.2/0.8 | / | 5745 | 0.369 | 1.11 |
|   | /       | 0.7/0.3 | 2563 | 0.320 | 190.4 |
| 3 | 0.2/0.8 | / | 5772 | 0.381 | 2.03 |
|   | /       | 0.7/0.3 | 2606 | 0.309 | 185.4 |
| 4 | 0.2/0.8 | / | 6044 | 0.382 | 1.17 |
|   | /       | 0.7/0.3 | 3189 | 0.314 | 210.1 |
| 5 | 0.2/0.8 | / | 5207 | 0.394 | 1.33 |
|   | /       | 0.7/0.3 | 2257 | 0.307 | 236.4 |
| 6 | 0.2/0.8 | / | 6244 | 0.404 | 1.53 |
|   | /       | 0.7/0.3 | 2567 | 0.331 | 143.5 |
| 7 | 0.2/0.8 | / | 4469 | 0.388 | 1.16 |
|   | /       | 0.7/0.3 | 2014 | 0.320 | 209.6 |
| 8 | 0.2/0.8 | / | 5039 | 0.414 | 1.42 |
|   | /       | 0.7/0.3 | 2460 | 0.317 | 177.3 |
| 9 | 0.2/0.8 | / | 4863 | 0.389 | 1.08 |
|   | /       | 0.7/0.3 | 2126 | 0.324 | 128.7 |
| 10 | 0.2/0.8 | / | 4136 | 0.396 | 0.93 |
|   | /       | 0.7/0.3 | 1968 | 0.318 | 193.0 |

Example 11

Preparation of the Main Component A of Catalyst:

(1) Preparation of magnesium-alcohol complex: a 200 ml solution of a magnesium compound (MgBuCl)$_y$(MgCl$_2$) In nascent state in THF was prepared according to the method disclosed in CN1041312C. Analyses showed the following results: Mg: 0.3594 mmol/ml, Cl: 0.5966 mmol/ml, Cl/Mg=1.66, therefore y=0.52. At room temperature, 1.5 ml of isobutanol (C$_4$H$_9$OH) was added In one batch into 30 ml of said solution. Then, the temperature was elevated to 40° C., and the reaction was continued for further 3 hours to obtain a solution of magnesium-alcohol complex In THF.

(2) Under nitrogen gas flow, a silica (Grace Davison 955) was gradually heated to 600° C. and kept at the temperature for 10 hours, then It was gradually cooled to room temperature for standby. To 7.50 g of the heat-treated silica were added 40 ml of hexane and 2.4 ml of diethyl aluminum chloride, and then the mixture was dried to give a silica carrier having alkyl aluminum compound supported thereon.

(3) The treated silica carrier (the product of step (2)) was added into the solution of the magnesium-alcohol complex in THF prepared in the step (1). The reaction was allowed to continue at 50° C. for 3 hours, and then was heated to 75° C. for drying. Drying was performed until the content of residual THF in the solid component was 2.36 wt %.

(4) The product of the step (3) was slurried in 50 ml of hexane, then 1.076 g of titanium tetrachloride was added thereto at room temperature. The reaction was allowed to continue at 50° C. for 3 hours, and then was heated to 70° C. to evaporate hexane, to give a solid main component A of catalyst.

Analyses showed the following results: Ti: 2.13 wt. %, Mg: 2.15 wt. %, Al: 3.85 wt %, and Cl: 15.79 wt. %.

Polymerization Evaluation:

The polymerization test for evaluation was carried out in a 2 L reactor according to the procedure as described in Example 1. The polymerization conditions and results of the polymerization test for evaluation of the catalyst are shown in Table 3.

Example 12

Preparation of the Main Component A of Catalyst:

(1) Preparation of magnesium-alcohol complex: the solution of magnesium compound in nascent state in THF as prepared in Example 11 was used. At room temperature, 2.8 ml of 2-ethylhexanol (C$_8$H$_{17}$OH) was added in one batch into 50 ml of said solution. Then, the temperature was elevated to 46° C., and the reaction was continued for further 3 hours to obtain a solution of magnesium-alcohol complex in THF.

(2) Under nitrogen gas flow, a silica (Crosfield ES70X) was gradually heated to 600° C. and kept at the temperature for 10 hours, then it was gradually cooled to room temperature for standby. To 8.13 g of the heat-treated silica were added 45 ml of hexane and 2.3 ml of diethyl aluminum chloride, and then the mixture was dried to give a silica carrier having alkyl aluminum compound supported thereon.

(3) The treated silica carder (the product of step (2)) was added into the solution of the magnesium-alcohol complex in THF prepared in the step (1). The reaction was allowed to continue at 50° C. for 3 hours, and then was heated to 82° C. for drying. Drying was performed until the content of residual THF in the solid component was 9.47 wt %.

(4) The product of the step (3) was slurried in 50 ml of hexane, then 1.392 g of titanium tetrachloride was added thereto at room temperature. The reaction was allowed to continue at 55° C. for 2 hours, and then was heated to 80° C. to evaporate hexane, to give a solid main component A of catalyst.

Analyses showed the following results: Ti: 2.01 wt. %, Mg: 2.49 wt. %, Al: 2.91 wt. %, and Cl: 15.61 wt. %.

Polymerization Evaluation:

The polymerization test for evaluation was carded out in a 2 L reactor according to the procedure as described in Example 1. The polymerization conditions and results of the polymerization test for evaluation of the catalyst are shown in Table 3.

Example 13

Preparation of the Main Component A of Catalyst:

(1) Preparation of magnesium-alcohol complex: a 200 ml solution of a magnesium compound $(MgBuCl)_y(MgCl_2)$ in nascent state in THF was prepared according to the method disclosed in WO 2004050723. Analyses showed the following results: Mg: 0.3678 mmol/ml, Cl: 0.4524 mmol/ml, Cl/Mg=1.23, and thus y=3.35. At room temperature, 3.5 ml of 2-ethylhexanol $(C_8H_{17}OH)$ was added in one batch into 60 ml of said solution. Then, the temperature was elevated to 40° C., and the reaction was continued for further 3 hours to obtain a solution of magnesium-alcohol complex in THF.

(2) Under nitrogen gas flow, a silica (Grace Davison 955) was gradually heated to 600° C. and kept at the temperature for 10 hours, then it was gradually cooled to room temperature for standby. To 10.67 g of the heat-treated silica were added 70 ml of hexane and 2.3 ml of diethyl aluminum chloride, and then the mixture was dried to give a silica carrier having alkyl aluminum compound supported thereon.

(3) The treated silica carrier (the product of step (2)) was added into the solution of the magnesium-alcohol complex in THF prepared in the step (1). The reaction was allowed to continue at 50° C. for 2 hours, and then was heated to 75° C. for drying. Drying was performed until the content of residual THF in the solid component was 7.83 wt %.

(4) The product of the step (3) was slurried in 50 ml of hexane, then 1.785 g of titanium tetrachloride was added thereto at room temperature. The reaction was allowed to continue at 50° C. for 3 hours, and then was heated to 70° C. to evaporate hexane, to give a solid main component A of catalyst.

Analyses showed the following results: Ti: 1.96 wt. %, Mg: 2.41 wt. %, Al: 3.23 wt %, and Cl: 17.30 wt. %.

Polymerization Evaluation:

The polymerization test for evaluation was carried out in a 2 L reactor according to the procedure as described in Example 1. The polymerization conditions and results of the polymerization test for evaluation of the catalyst are shown in Table 3.

Example 14

The main component A of catalyst prepared in Example 13 was used.

Before the polymerization, 70 ml of hexane was added into the component A to form a slurry, then 2.7 ml of diethyl aluminum chloride were added thereto at room temperature. After stirred for 2 hours, the slurry was dried to give a pre-activated main component of catalyst.

Polymerization Evaluation:

The polymerization test for evaluation was carried out in a 2 L reactor according to the procedure as described in Example 1. The polymerization conditions and results of the polymerization test for evaluation of the catalyst are shown in Table 3.

The particle size distribution of the polyethylene products obtained in the polymerization tests at the condition of low hydrogen level in Examples 11-14 was measured. The results are shown in Table 4.

Comparative Example 1

In this Comparative Example, the procedure as described in Example 1 of ZL 98110608 was followed to prepare a catalyst.

(1) To a 500 ml glass flask reactor were charged with 200 ml of hexane and 5.35 g of magnesium powder. At 20° C., 46 ml of n-butyl chloride was added to the reactor. The temperature was elevated to 60° C., and the reaction was continued at that temperature for 10 hours. Then, hexane was evaporated to dryness at 80° C., to give a solid. The obtained solid was dissolved in 250 ml of THF, to obtain a solution of $(MgBuCl)_yMgCl_2$ in THF. Analyses showed that the solution contained 0.8302 mmol Mg per ml of solution, and 1.468 mmol Cl per ml of solution, thus y=0.30.

(2) To a 250 ml glass flask reactor were charged with 13 ml of said solution obtained in the step (1), then 0.22 ml of titanium tetrachloride and 0.3 ml of diethyl aluminum chloride were added thereto. The reaction was heated under stirring to 70° C. and maintained at that temperature for 1 hour.

(3) 7.7 g of silica that had been heat-treated and chemically treated was added to the reaction mixture obtained in the step (2). Then THF was evaporated until the content of residual THF was 7.39 wt. %, to obtain a main component of catalyst. Analyses showed the following results: Ti: 1.44 wt. %, Mg: 1.76 wt. %, Al: 4.12 wt. %, and Cl: 9.89 wt. %.

Polymerization Evaluation:

The polymerization test for evaluation was carried out in a 2 L reactor according to the procedure as described in Example 1. The polymerization conditions and results of the polymerization test for evaluation of the catalyst are shown in Table 3.

Comparative Example 2

In this Comparative Example, the procedure as described in Example 1 of WO 2004050723 was followed to prepare a catalyst.

(1) Into a 500 ml glass flask reactor were charged with 70 ml of THF and 3.5299 g of magnesium powder. The temperature was elevated to 60° C., and then 19 ml of n-butyl chloride was slowly dropped In the reactor. When about a half of n-butyl chloride was added, 140 ml of THF was added in the reactor. The residual n-butyl chloride was continuously dropped. The total time of dropwise adding n-butyl chloride was about 1 hour. Upon completion of the addition, the reaction was continued at 60° C. for 3 hours, to obtain a solution of $(MgBuCl)_yMgCl_2$ In THF. The solution contained 0.6238 mmol/ml of Mg, and 0.7743 mmol/ml of Cl, thus y=3.12.

(2) In a 250 ml glass flask reactor, to 18 ml of the solution obtained in the step (1) was added 12.5 g of silica that had been heat-treated and chemically treated, and the mixture was stirred for 1 hour. Then THF was evaporated until the content of residual THF was 5 wt. %, to obtain a solid component To the solid component were added 50 ml of hexane and 6.8 ml of n-butyl chloride. The temperature was elevated to 65° C., and the reaction was continued at that temperature for 0.5 hour. Then, 1.2 ml of titanium tetrachloride and 1.3 ml of diethyl aluminum chloride were added thereto, and the reaction was continued for further 3 hours. Finally, hexane was evaporated to obtain a solid main component of catalyst. Analyses showed the following results: Ti: 2.33 wt. %, Mg: 2.42 wt. %, Al: 3.78 wt. %, and Cl: 12.16 wt. %, Polymerization Evaluation:

The polymerization test for evaluation was carried out in a 2 L reactor according to the procedure as described in Example 1. The polymerization conditions and results of the polymerization test for evaluation of the catalyst are shown in Table 3.

TABLE 3

| Example No. | Low H₂ level (H₂/C₂H₄) | High H₂ level (H₂/C₂H₄) | Polymerization activity (gPE/gcat) | Bulk density (g/cm³) | MI$_{2.16}$ (g/10 min) |
|---|---|---|---|---|---|
| 11 | 0.2/0.8 | / | 5387 | 0.395 | 1.94 |
|  | / | 0.7/0.3 | 2167 | 0.312 | 182.0 |
| 12 | 0.2/0.8 | / | 5691 | 0.385 | 1.28 |
|  | / | 0.7/0.3 | 2232 | 0.314 | 163.7 |
| 13 | 0.2/0.8 | / | 5408 | 0.387 | 1.69 |
|  | / | 0.7/0.3 | 2456 | 0.310 | 154.8 |
| 14 | 0.2/0.8 | / | 5873 | 0.390 | 1.84 |
|  | / | 0.7/0.3 | 2357 | 0.309 | 161.2 |
| Comparative Example 1 | 0.2/0.8 | / | 3321 | 0.387 | 1.78 |
|  | / | 0.7/0.3 | 916 | 0.293 | 143.7 |
| Comparative Example 2 | 0.2/0.8 | / | 7536 | 0.392 | 0.37 |
|  | / | 0.7/0.3 | 3712 | 0.311 | 53.4 |

TABLE 4

Particle size distribution of polymer obtained under low hydrogen level polymerization condition (wt %)

| Example No. | <20 mesh | 20-40 mesh | 40-75 mesh | 75-120 mesh | 120-200 mesh | >200 mesh |
|---|---|---|---|---|---|---|
| Example 11 | 0 | 75.5 | 20.5 | 2.7 | 1.1 | 0.2 |
| Example 12 | 0.9 | 68.5 | 26.9 | 2.3 | 1.0 | 0.4 |
| Example 13 | 0.1 | 71.9 | 23.8 | 2.9 | 1.2 | 0.1 |
| Example 14 | 0.4 | 74.3 | 22.1 | 2.4 | 0.8 | 0 |

Example 15

Polymerization reaction was carried out in a fluidized bed reactor having a diameter of 100 mm and a height of 1500 mm. Firstly, 100 g of vacuum-dried particulate polyethylene base material was charged into the fluidized bed reactor, then triethyl aluminum as the component B was added at such an amount that molar ratio of Al/Ti was equal to 150. After the fluidized state was established, an amount of the component A prepared according to Example 13 was added. With different composition of polymerization gases, polymerization was conducted under a total polymerization pressure of 1.2 MPa at 95° C. for 3 hours, to obtain white polyethylene. The results of the polymerization reaction are shown in Table 5.

TABLE 5

| Polymerization test No. | Composition of raw material gases | | Fractional pressure of ethylene (MPa) | Polymerization activity gPE/gcat | Density g/cm³ | Bulk density g/cm³ | MI$_{2.16}$ g/10 min |
|---|---|---|---|---|---|---|---|
|  | H₂/ethylene | 1-butene/ ethylene |  |  |  |  |  |
| 1 | 0.18 | 0.54 | 0.70 | 7500 | 0.905 | 0.332 | 1.24 |
| 2 | 0.21 | 0.43 | 0.73 | 8661 | 0.916 | 0.327 | 1.59 |
| 3 | 0.19 | 0.30 | 0.81 | 10321 | 0.936 | 0.353 | 1.47 |
| 4 | 0.24 | 0.20 | 0.83 | 9039 | 0.945 | 0.385 | 1.29 |
| 5 | 0.20 | 0.15 | 0.89 | 8939 | 0.952 | 0.396 | 1.11 |

What is claimed is:

1. A polyethylene catalyst consisting of a main component of catalyst and a cocatalyst, wherein the main component of catalyst is prepared by a preparation process comprising reacting the following components:

(1) a magnesium-alcohol complex prepared by reacting a magnesium compound in nascent state having a formula $(MgRX)_y(MgX_2)$ with an alcohol compound $R^1OH$ and an electron donor ED, wherein R is alkyl having 3-12 carbon atoms, X is halogen, y is in a range of from 0.02 to 4, and $R^1$ is alkyl having 2-12 carbon atoms, and wherein molar ratio of the alcohol compound to Mg in the magnesium compound in nascent state, $R^1OH$:Mg, is in a range of from 0.5:1 to 6:1;

(2) an alkyl aluminum compound having a formula $R^3_nAlCl_{3-n}$ supported on silica, wherein $R^3$ is alkyl having 1-14 carbon atoms, and n is in a range of from 1 to 3; and (3) a titanium compound having a formula $Ti(OR^2)_m Cl_{4-m}$, wherein $R^2$ is alkyl having 1-10 carbon atoms, and m is in a range of from 0 to 4; and the cocatalyst is an organic aluminum compound, and molar ratio of Al in the cocatalyst to Ti in the main component is in a range of from 30:1 to 300:1, wherein the preparation process produces a catalyst that, in a slurry polymerization process, catalyzes the polymerization of ethylene to polyethylene such that, under polymerization conditions of a temperature of 85° C., a total pressure of 1.0MPa, a ratio of Al/Ti of 200, a polymerization time of 2 hours, hexane as diluent, and addition of hydrogen gas, the catalyst exhibits a polymerization activity that drops by no more than 61% when a ratio of hydrogen/ethylene in the polymerization process increases from 0.2/0.8 to 0.7/0.3.

2. The polyethylene catalyst according to claim 1, wherein y in the formula of said magnesium compound in nascent state is in a range of from 0.1 to 1.85.

3. The polyethylene catalyst according to claim 1, wherein the molar ratio of said alcohol compound to Mg in said magnesium compound in nascent state, $R^1OH$:Mg, is in a range of from 1:1 to 3:1.

4. The polyethylene catalyst according to claim 1, wherein $R^1$ in said alcohol compound $R^1OH$ is alkyl having 4-10 carbon atoms.

5. The polyethylene catalyst according to claim 1, wherein said alkyl aluminum compound $R^3_nAlCl_{3-n}$ is an alkyl aluminum chloride compound.

6. The polyethylene catalyst according to claim 1, wherein said electron donor ED is an organic compound having at least one atom selected from the group consisting of O, S, N, Si and P.

7. The polyethylene catalyst according to claim 6, wherein said electron donor ED is THF.

8. The polyethylene catalyst according to claim 1, wherein said titanium $Ti(OR^2)_m Cl_{4-m}$ is selected from the group consisting of titanium tetrachloride, tetra-n-butyl titanate, methoxy titanium trichioride, butoxy titanium trichloride, and mixtures thereof.

9. The polyethylene catalyst according to claim 8, wherein said titanium $Ti(OR^2)_m Cl_{4-m}$ is titanium tetrachloride.

10. The polyethylene catalyst according to claim 1, wherein the slurry polymerization process, the catalyst exhibits a polymerization activity that drops by 47 to 61% when a ratio of hydrogen/ethylene in the polymerization process increases form 0.2/0.8 to 0.7/0.3.

11. The polyethylene catalyst according to claim 1, wherein the melt index $MI_{2.16}$ of the polyethylene formed in the slurry polymerization process when the ratio of hydrogen/ethylene is 0.7/'0.3 is at least 128.7 g/10 min.

12. The polyethylene catalyst according to claim 11, wherein the melt index $MI_{2.16}$ of the polyethylene formed in the slurry polymerization process when the ratio of hydrogen/ethylene is 0.7/0.3 is 128.7 to 236.4 g/10 min.

13. A main component of polyethylene catalyst prepared by a preparation process comprising reacting the following components:
 (1) a magnesium-alcohol complex prepared by reacting a magnesium compound in nascent state having a formula $(MgRX)_y(MgX_2)$ with an alcohol compound $R^1OH$ and an electron donor ED, wherein R is alkyl having 3-12 carbon atoms, X is halogen, y is in a range of from 0.02 to 4, and $R^1$ is alkyl having 2-12 carbon atoms, and wherein molar ratio of the alcohol compound to Mg in the magnesium compound in nascent state, $R^1OH$:Mg, is in a range of from 0.5:1 to 6:1;
 (2) an alkyl aluminum compound having a formula $R^3{}_n AlCl_{3-n}$ supported on silica, wherein $R^3$ is alkyl having 1-14 carbon atoms, and n is in a range of from 1 to 3; and
 (3) a titanium compound having a formula $Ti(OR^2)_m Cl_{4-m}$, wherein $R^2$ is alkyl having 1-10 carbon atoms, and m is in a range of from 0 to 4; wherein the preparation process produces the main component such that, when the main component is formed into a catalyst with a cocatalyst of an organic aluminum compound, with a molar ratio of Al in the cocatalyst to Ti in the main component in a range of from 30:1 to 300:1, the catalyst, in a slurry polymerization process, catalyzes the polymerization of ethylene to polyethylene wherein, under polymerization conditions of a temperature of 85° C., a total pressure of 1.0MPa, a ratio of Al/Ti of 200, a polymerization time of 2 hours, hexane as diluent, and addition of hydrogen gas, the catalyst exhibits a polymerization activity that drops by no more than 61% when a ratio of hydrogen/ethylene in the polymerization process increases from 0.2/0.8 to 0.7/0.3.

14. A process for preparing the polyethylene catalyst according to claim 1, comprising the steps of
 (1) preparing magnesium-alcohol complex: dissolving a magnesium compound in nascent state of a formula $(MgRX)_y(MgX_2)$ in an electron donor ED to form a homogenous solution, reacting said solution with an alcohol compound $R^1OH$ to obtain a solution of magnesium-alcohol complex in the electron donor ED, wherein R is alkyl having 3-12 carbon atoms, X is halogen, y is in a range of from 0.02 to 4, and R1 is alkyl having 2-12 carbon atoms and wherein molar ratio of the alcohol compound to Mg in the magnesium compound in nascent state, $R^1OH$/Mg, is in a range of from 0.5:1 to 6:1;
 (2) supporting an alkyl aluminum compound of a formula $R^3{}_n AlCl_{3-n}$ on a silica, wherein $R^3$ is alkyl having 1-14 carbon atoms, and n is in a range of from 1 to 3, and wherein the alkyl aluminum compound is used in such an amount that the molar ratio of Al in $R^3{}_n AlCl_{3-n}$ to $R^1OH$ is in a range of from 0.1:1 to 1.5:1;
 (3) reacting the solution of magnesium-alcohol complex in electron donor with the silica having the alkyl aluminum compound supported thereon by impregnating, and then drying the resultant mixture to obtain a solid product, wherein the content of the residual electron donor ED in the solid product is controlled in a range of from 1 to 10 percent by weight, and wherein said silica is used in an amount of from 0.2 g silica per millimole of Mg to 1.0 g silica per millimole of Mg;
 (4) reacting the solid product of the step (3) with an titanium compound of formula $Ti(OR^2)_m Cl_{4-m}$, in which $R^2$ is alkyl having 1-10 carbon atoms, and m is in a range of from 0 to 4, in a hydrocarbon solvent, and then drying the reaction mixture to obtain a solid main component of catalyst, wherein the titanium compound is used in such an amount that molar ratio of Mg in the product of the step (3) to Ti in the titanium compound is equal to (0.5-5):1;
 (5) contacting the main component of catalyst with a cocatalyst to form a catalyst, wherein the cocatalyst is an organic aluminum compound, and molar ratio of Al in the cocatalyst to Ti in the main component of the catalyst ranges from 30:1 to 300:1.

15. The process according to claim 14, wherein the molar ratio of said alcohol compound to Mg in said magnesium compound in nascent state, $R^1OH$:Mg, is in a range of from 1:1 to 3:1.

16. The process according to claim 14, wherein the alkyl aluminum compound is used in such an amount that the molar ratio of Al in $R^3{}_n AlCl_{3-n}$ to said alcohol compound $R^1OH$ is in a range of from 0.3:1 to 1.0:1.

17. The process according to claim 14, wherein the content of the residual electron donor in the solid product is controlled in a range of from 3 to 6 wt. %.

18. The process according to claim 14, wherein said silica is used in an amount of from 0.3 g silica per millimole of Mg to 0.9 g silica per millimole of Mg.

19. The process according to claim 14, wherein the titanium compound is used in such an amount that the molar ratio of Mg in the product of the step (3) to Ti in the titanium compound is equal to (1-4):1.

20. A process for polymerizing ethylene, comprising the step of contacting ethylene and optional α-olefin comonomer(s) having from 3 to 20 carbon atoms with the catalyst of claim 1 under polymerization conditions.

21. A process for polymerizing ethylene, comprising the steps of:
 (i) providing the catalyst according to claim 1;
 (ii) ethylene and optional α-olefin comonomer(s) having from 3 to 20 carbon atoms with the catalyst under polymerization conditions, to form a polyethylene product; and
 (iii) recovering the polyethylene product.

22. The process for polymerizing ethylene according to claim 21, wherein the polymerization is conducted in a process comprising slurry polymerization and/or gas-phase polymerization.

23. A process for polymerizing ethylene, comprising the steps of:
   (i) providing the catalyst according to claim 1;
   (ii) contacting ethylene with the catalyst under polymerization conditions including a high molar ratio of hydrogen gas to ethylene, to form a polyethylene having low molecular weight containing active catalyst therein;
   (iii) contacting ethylene and α-olefin comonomer(s) having from 3 to 20 carbon atoms with said polyethylene having low molecular weight containing active catalyst therein under polymerization conditions including a low molar ratio of hydrogen gas to ethylene, to form a polyethylene polymer having bimodal or broad distribution of molecular weight; and
   (iv) recovering the polyethylene polymer.

24. The process for polymerizing ethylene according to claim 23, wherein the polymerization is conducted in a process comprising slurry polymerization and/or gas-phase polymerization.

25. The process for polymerizing ethylene according to claim 23, wherein the step (ii) is conducted in a slurry polymerization process, and the step
   (iii) is conducted in a gas-phase polymerization process.

* * * * *